US012689074B2

(12) United States Patent (10) Patent No.: US 12,689,074 B2
Modica et al. (45) Date of Patent: Jul. 21, 2026

(54) PROCESS WITH LOW ENVIRONMENTAL IMPACT AND REDUCED ENERGY CONSUMPTION FOR THE RECOVERY OF LEAD FROM THE ELECTRODE PASTES OF END-OF-LIFE BATTERIES

(71) Applicant: ENN.CO SRL, Castiglione delle Stiviere (IT)

(72) Inventors: Giovanni Modica, Milan (IT); Arturo Sommariva, Salsomaggiore Terme (IT)

(73) Assignee: METALLON CLEAN EXTRACTIONS B.V., Rotterdam (NL)

( * ) Notice: Subject to any disclaimer, the term of this patent is extended or adjusted under 35 U.S.C. 154(b) by 609 days.

(21) Appl. No.: 18/019,071

(22) PCT Filed: Jul. 16, 2021

(86) PCT No.: PCT/IB2021/056433
§ 371 (c)(1),
(2) Date: Jan. 31, 2023

(87) PCT Pub. No.: WO2022/029531
PCT Pub. Date: Feb. 10, 2022

(65) Prior Publication Data
US 2023/0307733 A1 Sep. 28, 2023

(30) Foreign Application Priority Data
Aug. 4, 2020 (IT) ........................ 102020000017320

(51) Int. Cl.
H01M 10/54 (2006.01)
C22B 3/00 (2006.01)
C22B 3/46 (2006.01)
H01M 10/06 (2006.01)

(52) U.S. Cl.
CPC ............... H01M 10/54 (2013.01); C22B 3/46 (2013.01); C22B 13/045 (2013.01); H01M 10/06 (2013.01)

(58) Field of Classification Search
None
See application file for complete search history.

(56) References Cited

U.S. PATENT DOCUMENTS

| | | | | | |
|---|---|---|---|---|---|
| 3,743,501 | A | * | 7/1973 | Cucanelli | ............... C22B 19/24 |
| | | | | | 205/604 |
| 4,118,219 | A | | 10/1978 | Elmore et al. | |
| 4,893,756 | A | * | 1/1990 | Fetcenko | .............. C01B 3/0031 |
| | | | | | 241/1 |
| 2017/0170532 | A1 | * | 6/2017 | Blais | ......................... C25C 7/06 |

FOREIGN PATENT DOCUMENTS

| | | | | | | |
|---|---|---|---|---|---|---|
| CN | 201505658 | U | * | 6/2010 | | |
| CN | 103773972 | A | * | 5/2014 | ............... | C22B 3/44 |
| CN | 107674977 | A | * | 2/2018 | ............ | H01M 10/06 |
| CN | 108796230 | A | | 11/2018 | | |
| CN | 110306060 | A | * | 10/2019 | ............ | C22B 19/30 |
| CN | 103509949 | B | | 5/2020 | | |
| CN | 110423884 | B | | 5/2020 | | |
| IT | 201600089470 | A1 | * | 3/2018 | ............ | H01M 10/54 |
| WO | 0121846 | A1 | | 3/2001 | | |

OTHER PUBLICATIONS

English translation of IT-201600089470-A1. (Year: 2018).*
English translation of CN-201505658-U. (Year: 2010).*
English translation of CN-107674977-A Description. (Year: 2018).*
English translation of CN-103773972-A Description. (Year: 2014).*
English translation of CN-110306060-A Description. (Year: 2019).*
International Search Report and Written Opinion dated Nov. 4, 2021 in corresponding International Application No. PCT/IB2021/056433, 12 pages.

* cited by examiner

*Primary Examiner* — Anthony J Zimmer
*Assistant Examiner* — Zachary John Baum
(74) *Attorney, Agent, or Firm* — MH2 Technology Law Group LLP

(57) ABSTRACT

A process for obtaining metallic lead from its compounds present in an end-of-life lead-acid battery through a direct solid-solid reaction with metallic zinc includes a) dry mixing of the mixture of lead compounds present in an end-of-life lead-acid battery with a metered quantity of metallic zinc powder; b) an addition to the mass, during mixing, of water and of an aqueous solution containing a substance capable of forming soluble zinc salts; c) a separation of the solid, essentially consisting of metallic lead, from the liquid phase in which the soluble zinc salt is present; and d) an electrolytic treatment of the resulting previously separated solution in order to recover metallic zinc suitable for reuse in the dry mixing treatment.

17 Claims, No Drawings

PROCESS WITH LOW ENVIRONMENTAL IMPACT AND REDUCED ENERGY CONSUMPTION FOR THE RECOVERY OF LEAD FROM THE ELECTRODE PASTES OF END-OF-LIFE BATTERIES

CROSS-REFERENCE TO RELATED APPLICATIONS

This application is a U.S. National Stage application of PCT/IB2021/056433, filed Jul. 16, 2021, pending, which claims priority to Italian Patent Application No. 102020000017320, filed Aug. 4, 2020, the entire disclosures of which are hereby incorporated by reference in their entireties.

FIELD OF THE ART

The present disclosure relates to the field of chemical treatments for the recovery of materials; in more detail, the present disclosure relates to a process for the recovery of lead from batteries.

BACKGROUND ART

Most of the lead used comes from its recovery from lead-acid current accumulators (batteries) at the end of their life. In these accumulators there are, on average, the following materials:

grids and poles, made of lead alloys, equal to 27.8%;
paste [typically a mixture of lead oxides (II and IV) and lead sulfate], equal to 36%;
polypropylene and other polymers, equal to 5.6%;
separators, equal to 8.2%;
diluted sulfuric acid, equal to 22.4%.

Lead recovery from grids and poles is simple and inexpensive. The same goes for propylene.

Heavy plastics and diluted sulfuric acid, on the other hand, end up in special landfills at high costs.

Complex and very expensive is also the recovery of lead from paste, which is the mixture or electrode paste present in the batteries, and which comprises lead oxide (IV), $PbO_2$ and lead oxy-sulfates with generic formula $nPbO \cdot PbSO_4$, with n=1, 3 or 4, which are the basis, during battery operation, of the "chemical energy↔electrical energy" reversible reaction.

The paste has the following average composition, expressed as lead compounds: 60% sulfate, 24% oxide (IV) and the balance 16% oxide (II).

The lead content in the paste, expressed as metal, amounts to 76% so that in each ton of batteries it amounts to 273.6 kg. The process adopted for the recovery of lead from paste is now only the pyrometallurgical one.

After desulfation treatment, which consists in the conversion of the sulfate into lead carbonate or oxide by treatment with sodium carbonate or hydroxide, the paste is baked for many hours in an oven at over 1,000° C., together with coal and iron, used as reducing agents, with the addition of glass and soda which act as fluxes and scorifiers. The operating conditions necessary to obtain lead recovery make this process considerably energy-intensive. The desulfation reaction of the paste, moreover, is never exhaustive and therefore part of the lead sulfate remains unconverted into carbonate.

The part of the sodium sulfate solution which remains incorporated in the desulfated paste, which at high temperature reacts with the lead carbonate converting it back into sulfate, also contributes to making the process management economically inefficient. All these contributing causes make the pyrometallurgical recovery process of lead generate slags which incorporate significant quantities of lead and its compounds which are irreversibly lost.

Said slags release dangerous substances and therefore are classified as toxic-noxious material and must be disposed of in special landfills, thus implying very high costs.

To make this process even more complex is the management of the emissions of dangerous fumes, containing NOx, SOx and dusts containing lead compounds, which require very complex and expensive abatement plants.

The recovery of lead from paste, by means of electrolysis, now almost abandoned, should have allowed reducing costs and emissions but in reality this does not happen. The desulfation of 1 ton of paste also involves the consumption of about 209.9 kg of $Na_2CO_3$ and the production of about 281 kg of anhydrous $Na_2SO_4$. Under the operating conditions adopted by recyclers, the anhydrous sodium sulfate is recovered after evaporating 1.592 kg of water. This operation contributes to making the process even more energy-intensive.

There is therefore a need to optimize the lead recovery process from paste.

SUMMARY

According to the present disclosure, a process is described for obtaining metallic lead from its compounds present in an end-of-life lead-acid battery by direct solid-solid reaction with metallic zinc, characterized by:

a) dry mixing of the mixture of lead compounds present in an end-of-life lead-acid battery with a metered quantity of metallic zinc powder, b) addition to the mass, during mixing, of water and of an aqueous solution containing a substance capable of forming soluble zinc salts, c) separation of the solid, essentially consisting of metallic lead, from the liquid phase in which the soluble zinc salt is present, d) electrolytic treatment of the separated solution in order to recover metallic zinc suitable for reuse in the treatment referred to in point 1.a).

According to a further (2nd) non-limiting aspect, as per point 1.b), the substance capable of forming soluble zinc salts is sulfuric acid.

According to a further (3rd) non-limiting aspect, as per point 1.d), the acid solution resulting after the electrolysis for the recovery of zinc is treated with a metered quantity of carbonate or hydroxide of an alkaline earth metal which reacts with part of the sulfate ions forming an insoluble sulfate and separating a residual acid solution with a quantity of free acid which makes it suitable for reuse in the operation described in point 1.b).

According to a further (4th) non-limiting aspect, as per point 1.d), the acid solution resulting from the electrolytic recovery is directly used without any treatment as an electrolyte for new lead-acid batteries.

According to a further (5th) non-limiting aspect, as per point 1.b) the process involves the use, instead of sulfuric acid, of aqueous solutions containing alkaline substances which react with the zinc compounds forming a soluble zincate and a soluble sulfate of the cation of the alkaline substance and after the separation of the solid consisting essentially of metallic lead, the zincate of the alkaline substance used and the sulfate of the cation present in the alkaline substance are present in the liquid phase.

According to a further non-limiting aspect (6th), the process provides for an electrolysis treatment of the solution in order to recover metallic zinc suitable for use in the operation described in point 1.a).

According to a further (7th) aspect, a treatment of the alkaline solution resulting from the electrolytic treatment referred to in the previous aspect with barium hydroxide is also described in order to insolubilize the sulfate ions present as insoluble barium sulfate and obtain an alkaline solution suitable for being recycled at the process as described in the fifth aspect.

According to a further (8th) non-limiting aspect, sulfuric acid is the one present in batteries at the end of their life.

According to a further (9th) non-limiting aspect, carbonates or oxides of the alkaline earth metals are those of calcium or barium.

According to a further (10th) non-limiting aspect, the electrolysis treatment takes place in an electrolytic cell made with a magnesium cathode and a nickel anode which allow electrolysis to be carried out with very high efficiency, operating with current densities ranging from 600 up to 1400 $A/m^2$.

According to a further (11th) aspect, a process is described herein for obtaining metallic lead from its compounds present in an end-of-life lead-acid battery by a direct solid-solid reaction with metallic zinc, said process comprising:

a) a dry mixing step of a mixture of lead compounds present in an end-of-life lead-acid battery with a metered quantity of metallic zinc powder, b) an addition to the mass, during mixing, of water and of an aqueous solution containing a substance capable of forming soluble zinc salts, c) a separation of a solid, essentially consisting of metallic lead, from a liquid phase in which a soluble zinc salt is present, d) an electrolytic treatment of the separated solution, in order to recover metallic zinc suitable for reuse in the treatment referred to in point a).

According to a further (12th) aspect, a process is described herein for obtaining metallic lead from its compounds present in an end-of-life lead-acid battery by a direct solid-solid reaction with metallic zinc, said process comprising:

a) a dry mixing step of a mixture of lead compounds present in an end-of-life lead-acid battery with a metered quantity of metallic zinc powder, said mixing step being intended to produce a predetermined mixed mass of lead compounds, b) an addition to the mass, during mixing, of water and of an aqueous solution containing a substance capable of forming soluble zinc salts, c) a separation of a solid, essentially consisting of metallic lead, from a liquid solution in which a soluble zinc salt is present, and d) an electrolytic treatment of the previously separated liquid solution, in order to recover metallic zinc suitable for being reused in the mixing step.

According to a further (13th) non-limiting aspect, the substance capable of forming soluble zinc salts comprises, optionally is, sulfuric acid.

According to a further (14th) non-limiting aspect, the liquid phase determines the production of a separate solution.

According to a further (15th) non-limiting aspect, dry mixing causes said mass to be obtained.

According to a further (16th) non-limiting aspect, said liquid phase is and/or constitutes a portion of said mass.

According to a further (17th) non-limiting aspect, the process comprises a step of further treatment of the solution resulting from the electrolytic treatment to recover the metallic zinc with a metered quantity of carbonate or oxide, in particular hydroxide, of an alkaline earth metal which reacts with part of sulfate ions present in the acid solution forming an insoluble sulfate, and the step of further treatment of the acid solution comprises a separation of a residual acid solution with a quantity of free acid, the separation making said residual acid solution suitable for reuse in the addition step.

According to a further (18th) non-limiting aspect, the solution resulting from the electrolytic treatment is an acid solution.

According to a further (19th) non-limiting aspect, the solution resulting from the electrolytic treatment is intended to be used, optionally without any further treatment, as an electrolyte for new lead-acid batteries.

According to a further (20th) non-limiting aspect, the process comprises a step of pouring at least part of the solution resulting from the electrolytic treatment into a lead-acid battery.

According to a further (21st) non-limiting aspect, following the pouring step, said solution is intended to act as an electrolyte for the lead-acid battery.

According to a further (22nd) non-limiting aspect, said solution comprises zinc in an amount substantially ranging from 40 g/l to 140 g/l.

According to a further (23rd) non-limiting aspect, the process comprises the use, instead of sulfuric acid as a substance capable of forming soluble zinc salts, of an aqueous solution containing at least one alkaline substance, said at least one alkaline substance reacting with zinc compounds to form a soluble zincate and a soluble sulfate of the cation of the alkaline substance.

According to a further (24th) non-limiting aspect, after the separation of the solid consisting essentially of metallic lead, the zincate of the alkaline substance and the sulfate of the cation present in the alkaline substance are present in the liquid phase.

According to a further (25th) non-limiting aspect, the process comprises an electrolysis treatment of the separated solution.

According to a further (26th) non-limiting aspect, the process comprises a recovery of metallic zinc following the electrolysis treatment, said metallic zinc being suitable for use in the dry mixing step.

According to a further (27th) non-limiting aspect, the electrolysis treatment is carried out in an electrolytic cell made with a magnesium cathode and a nickel anode.

According to a further (28th) non-limiting aspect, the electrolysis treatment takes place with current densities ranging from 600 $A/m^2$ and 1400 $A/m^2$, optionally from 600 $A/m^2$ to 1200 $A/m^2$.

According to a further (29th) non-limiting aspect, the sulfuric acid is sulfuric acid extracted from end-of-life batteries, and/or the process comprises an extraction of sulfuric acid from end-of-life batteries and a use of the extracted sulfuric acid for said addition to the mass.

According to a further (30th) non-limiting aspect, the carbonate or oxide of the alkaline earth metals is calcium or barium carbonate or oxide.

According to a further (31st) non-limiting aspect, the electrolysis treatment determines the production of an alkaline solution.

According to a further (32nd) non-limiting aspect, the process comprises a treatment of the alkaline solution resulting from the electrolytic treatment, said treatment taking place with barium hydroxide.

According to a further (33rd) non-limiting aspect, said treatment produces an insolubilization of sulfate ions present in the alkaline solution and determines the production of insoluble barium sulfate, said alkaline solution constituting said substance capable of forming soluble zinc salts.

According to a further (34th) non-limiting aspect, the process comprises the addition of water and of an aqueous solution containing a substance capable of forming soluble zinc salts in said mass which causes an exothermic reaction.

According to a further (35th) non-limiting aspect, the mixing step takes place with active heat removal; in particular, the mixing step comprises the introduction of said mass into a mixer provided with a cooling jacket configured to at least partially dissipate the heat produced by the exothermic reaction.

According to a further (36th) non-limiting aspect, the separation comprises the use of ultrasounds to facilitate the detachment of the solid, essentially consisting of metallic lead, from said liquid phase, optionally comprising the activation of at least one ultrasound transducer operatively acting on a containment tank of said mixer to promote the detachment of the solid, essentially consisting of metallic lead, from said liquid phase.

According to a further (37th) non-limiting aspect, the addition, to said mass, of water and of the aqueous solution containing the substance capable of forming soluble zinc salts, determines the achievement of a pH value substantially ranging from 2.1 to 4.4, preferably substantially ranging from 2.3 to 4.2 and more preferably ranging from 2.5 to 4.

According to a further (38th) non-limiting aspect, said pH value is substantially indicative of a substantial separation between the solid, essentially consisting of metallic lead, and the liquid phase in which the soluble zinc salt is present.

According to a further (39th) non-limiting aspect, the addition of water and of the aqueous solution containing the substance capable of forming soluble zinc salts follows the mixing step, and/or wherein the separation of the solid from the liquid phase follows the addition step, and wherein such separation determines the obtainment of a separate solution, and/or the electrolytic treatment follows the separation step.

According to a further (40th) non-limiting aspect, the process comprises a step of purification of the separated solution through the addition of metallic zinc powder, said addition of metallic zinc powder determining a precipitation of impurities comprising at least one of the following compounds: manganese compounds, cadmium compounds, nickel compounds, cobalt compounds.

According to a further (41st) non-limiting aspect, said substance capable of forming soluble zinc salts comprises sulfuric acid ranging from 6% to 14%, more preferably from 8% to 12%, even more preferably substantially 10% sulfuric acid or comprises sulfuric acid ranging from 20% to 30%, more preferably from 23% to 27%.

According to a further (42nd) non-limiting aspect, the mixing step lasts for a time substantially ranging from 2 minutes to 10 minutes.

According to a further (43rd) non-limiting aspect, given a mass of 1000 kg of lead compounds present in a lead-acid battery, optionally comprising between 30 and 70 kg of water, optionally comprising between 40 and 60 kg of water, in the mixing step said metered quantity of metallic zinc powder substantially ranges from 255 kg to 295 kg, more preferably from 265 kg to 285 kg.

According to a further (44th) non-limiting aspect, the aqueous solution containing the substance capable of forming soluble zinc salts comprises potassium hydroxide, optionally comprising potassium hydroxide ranging from 26% to 36%.

According to a further (45th) non-limiting aspect, said alkaline solution comprises potassium zincate, potassium sulfate and potassium hydroxide in excess.

According to a further (46th) non-limiting aspect, the addition to the mass, during the mixing step, of water and of the aqueous solution containing a substance capable of forming soluble zinc salts is an addition in two steps, comprising a first step of adding said substance, in particular sulfuric acid ranging from 6% to 14%, more preferably from 8% to 12%, even more preferably substantially 10% sulfuric acid, and comprising a second step of adding said substance, in particular sulfuric acid ranging from 20% to 30%, more preferably from 23% to 27%, said second step being subsequent to said first step and taking place when the free acidity of a resulting intermediate mixture is substantially absent.

According to a further (47th) non-limiting aspect, the process comprises a crystallization step of the soluble zinc salts, said crystallization step taking place following a purification process of said soluble zinc salts.

According to a further (48th) non-limiting aspect, the crystallization step is a crystallization step of the zinc salts of said separate solution.

DETAILED DESCRIPTION

The object of the present disclosure is a new process based on solid state reactions which allow, in a single step, the recovery of lead in the form of metal from all the compounds present in the paste. In fact, in this process, metallic lead is obtained with reactions among the compounds present in the paste and metallic zinc. This way of operating distinguishes this process from all the others so far patented and/or applied. The main formal reactions of the process described herein are reported below, specifying the water solubility of the compounds involved in order to understand the mechanism of the different reactions:

lead dioxide reaction:

$$PbO_{2(insoluble)}+2Zn\ metal_{(insoluble)} \rightarrow Pb\ metal_{(insoluble)}+2ZnO_{(insoluble)}$$

lead oxide reaction:

$$PbO_{(insoluble)}+Zn\ metal_{(insoluble)} \rightarrow Pb\ metal_{(insoluble)}+ZnO_{(insoluble)}$$

lead sulfate reaction:

$$PbSO_{4(insoluble)}+Zn\ metal_{(insoluble)} \rightarrow Pb\ metal_{(insoluble)}+ZnSO_{4(soluble)}$$

To activate and complete the aforementioned reactions, a careful mixing of the mass, the addition of water to solubilize the reaction product $ZnSO_4$ resulting from the reaction of lead sulfate with metallic zinc and the addition of substances that solubilize the layer of zinc oxide which forms on metallic zinc as a result of redox reactions with lead oxides are necessary. In this way, the surface of the metallic zinc is freed, thus making it reactive for the continuation of the reaction. It is therefore convenient to add, in a controlled manner, to the solid mass during the reaction step, water and acid or alkaline solutions which form soluble compounds by reacting with zinc oxide.

The speed of the reaction is further increased by the application of ultrasounds which facilitate the reaction at the solid-liquid interface since they facilitate the detachment of the layer of oxide from the metallic zinc and the subsequent solubilization of the soluble zinc salts in the aforesaid mass resulting from the mixing of the lead compounds with a metered amount of metallic zinc powder.

In the present disclosure, solubilizing solutions are used, and the presence of zinc oxide further and clearly distinguishes it from all the others which, on the other hand, use lead compounds as solubilizing solutions.

Many of the acid or alkaline solutions potentially usable in this disclosure, in fact, are absolutely unable to solubilize the sulfate, the lead oxide and dioxide, and this further confirms that the reactions between the lead compounds and the metallic zinc occur essentially in the solid state and should be classified as spurious cementation and/or mechanical chemical reactions.

In chemistry, "cementation" indicates a reaction through which a less noble metal displaces another more noble metal from the solutions of its salts, precipitating it in the form of "cement", that is, free metal, while mechanical chemistry is the chemistry of the solid state which exploits the reactions activated by the application of mechanical forces, such as compression, friction, centrifugation.

The reactions that take place, however, in this process are not cementation reactions, in the literal sense of the definition, since the metal salts to be cemented are not found in solution but are in a solid state and, furthermore, it is not possible to speak of actual mechanical chemical reactions since the high forces that characterize this type of reactions must not be exerted on the masses.

To carry out the process herein described, all the acid substances that form soluble zinc salts can be used, among which sulfuric acid is also present, which is normally contained in batteries at the end of their life; the process herein described therefore allows a profitable reuse of the acid present in the batteries at the end of their life.

This represents a significant advantage with respect to known techniques, since the problem of disposing of this acid, classified as a dangerous substance due to the content of toxic substances deriving from its origin, is solved.

The possibility of using sulfuric acid for carrying out the process herein described is a confirmation that in this process there are no phases in which the solubilization of the lead compounds present in the paste is contemplated.

Sodium hydroxide and potassium hydroxide, both effective in solubilizing zinc oxide, can conveniently be used as alkaline substances. By adding to the mass, for example, sulfuric acid, the zinc oxide formed as a result of the reaction with the lead oxides (II and IV) is solubilized as sulfate while the zinc sulfate resulting from the reaction between zinc and lead sulfate is already, by itself, very soluble in water and does not require the use of reagents to be solubilized.

In an alkaline environment, the reaction with zinc oxide leads to the formation of soluble zincates. These reactions between the lead compounds and the metallic zinc are thermodynamically very favored and this promotes the course of the reactions.

This greatly simplifies the whole process of recovering lead from the paste since, in a single step, the lead compounds present in the paste are substantially all converted into metallic lead.

The resulting solutions (separate solutions), after the lead recovery, contain only zinc ions, and can be conveniently treated in electrolytic cells in order to recover most of the zinc in the form of metal to be recycled in the process. The electrolytic recovery of zinc directly from the resulting solutions after the reduction of lead compounds has numerous advantages with respect to the electrolytic recovery of lead since:

the typical problems present in the acid electrolysis of lead with the formation of dioxide at the anode and of anode sludge do not occur, it is not necessary to operate at low current density to limit the formation of dioxide, the working environment is not at high risk for both the environment and the workers, electrolysis can be carried out with a current density at least quadruple, with respect to that of lead deposit with traditional technology, a drastic reduction in the size of the electrolysis system is achieved, the cathodic current efficiency of the zinc recovery is always close to 100%, secondary reactions at the electrodes are absent, no anodic sludge is formed.

The electrolytic recovery reaction of zinc from zinc sulfate solutions proceeds with very high current efficiency, in particular when operating with a zinc concentration comprised between a starting 140 g/l and 40 g/l zinc at the end of electrolysis. In this case the recovery is worth 71% of the zinc present.

The soluble zinc salts can be subjected to a crystallization process by means of a purification of the solution resulting from the electrolytic process. This crystallization process allows said zinc salts to be sold as they are.

The treatment of the final solution resulting from the electrolytic recovery process provides two options, described below and indicated with the letters of the Greek alphabet α and β.

Option α—The exhausted solution still containing 40 g/l of zinc is conveniently used as an electrolyte in new lead-acid batteries without compromising the features thereof (current delivery, duration, recharging efficiency, etc.). This is possible because in this solution the only cations present are the protons $H_3O^+$ and $Zn^{2+}$, as the treatment with metallic zinc cements, in addition to lead, all the other cations, excluding the alkaline and alkaline earths. The so-called valve cations (Nickel, Cobalt, Manganese, Iron, Titanium, etc.) are absent in this solution and this guarantees an optimal life of the battery which uses the aforementioned exhausted solution as electrolyte.

Option β—The free sulfuric anion deriving from the electrolytic deposit of zinc can be eliminated from the exhausted solution. The elimination of the sulfuric anion can be carried out, for example, by using calcium or barium compounds. In this case it is essential to use oxides or carbonates in order not to introduce other anions into solution.

The separated insoluble sulfates, free of toxic substances, precisely because deriving from very pure solutions deriving from the treatment with metallic zinc, are used in the paint and plaster market and in other sectors. The resulting solution can be usefully recycled in the paste treatment process.

By operating, on the other hand, in an alkaline environment, this option can always be implemented but the only product that can be used to eliminate excess sulfuric acid is barium hydroxide, partially soluble in the reaction environment.

The object of the disclosure can be better understood with the descriptions given in the examples which are not intended to be exhaustive in describing the potential of the disclosure.

Example No. 1

In a mass of 1,000 kg there are 50 kg of water, 60 kg of different materials coming from the dismantling of the batteries (fragments of grids, separators, rubber, etc.) and 890 kg of dry paste containing the following compounds: 142.4 kg of lead oxide (II), 213.6 kg of lead oxide (IV) and 534 kg of lead sulfate. 275 kg of zinc powder were mixed with this mass. Considering the very high apparent specific weight of the mass in reaction, the mixing is carried out in a suitable equipment having a structure similar to the machines named "planetary mixers" used in different fields to mix very viscous mixtures such as bread, putties, paints, plasters, etc.

The equipment used is also provided with a cooling jacket to dispose of the large amount of heat that is released during the reaction. Piezoelectric ultrasound transducers are applied to the external walls to improve at the interface the contact between the solid materials in reaction and between these and the aqueous phase. To facilitate the mixing and contact between the lead compounds and the metallic zinc and to dispose of part of the reaction heat, we proceeded by initially adding 650 kg of water to the solid mass and carrying out an energetic action of mixing and simultaneous pulping in order to favor the contact between the zinc and the compounds present in the paste. After a few minutes of mixing, in particular after at least 2 minutes, or 5 minutes or 10 minutes of mixing, the addition of 829.5 kg of 10% sulfuric acid present in the dismantled batteries from which the mass of 1,000 kg of paste used in this example was obtained took place.

Once the addition of the acid coming from the batteries was completed, the mass was mixed for a few minutes, also applying ultrasounds. When the free acidity of the mass was practically absent, the reaction was completed by gradually adding 615 kg of 25.2% sulfuric acid obtained by mixing 96-98% commercial acid and water. Therefore, according to Example 1, the addition of sulfuric acid as aqueous solution containing a substance capable of forming soluble zinc salts occurs in two steps. The progress of the reaction is clearly visible by the discoloration of the mass which changes from dark brown to bright metallic color and by the considerable amount of heat that develops.

It has been checked that the mass has a pH of about 2.5÷4 in order to have the guarantee that all the zinc has been consumed and that it does not remain incorporated in the lead in the metal state. At the end of the reaction, a solid consisting of metallic lead and an acid solution, in particular slightly acidic, in which zinc is present in the ionic state with a concentration of 140 g/l was separated from the mass. The separated solid lead was squeezed, and then suitably pulped and suspended in water to remove the zinc sulfate solution as much as possible.

The solution obtained was conveniently recycled in the process for the initial dilution of the reaction mass and/or for the dilution of the concentrated acid. The solution of first separation of zinc sulfate is sufficiently pure to proceed with the electrolytic recovery of the zinc according to the classical method used in the metal zinc production industries.

However, if the solution is not pure enough, it is possible to proceed to its purification by adding a small amount of metallic zinc powder to precipitate any impurities consisting essentially of compounds of manganese, cadmium, nickel, cobalt and other metal ions which can interfere with electrolysis.

The electrolysis reaction of the zinc sulfate solution was carried out by operating at a current density of 1,000 A/m$^2$ until the zinc concentration was reduced to about 40 g/l. The resulting final solution now contains a free sulfuric acid deriving from the cathode deposit of zinc.

Among the many potential applications, it has been surprisingly verified that this solution can be conveniently used as an electrolyte in new lead-acid batteries instead of the traditional 30% sulfuric acid. The batteries thus obtained have the same behavior as the traditional ones using sulfuric acid as electrolyte. In this way, the convenient use of the acid solution is so obtained without any treatment. This application is possible since the reactions involved in the operation of a lead-acid accumulator are not affected by the presence of Zn$^{2+}$ ions.

Example No. 2

In the process according to Example 2 a procedure similar to that of Example 1 was followed but the excess of sulfate ions, in particular deriving from the electrolytic deposit of zinc, was eliminated, treating the solution with barium or calcium compounds, preferably oxide or carbonate, obtaining the formation of barium sulfate or calcium sulfate.

After the separation of the insoluble sulfate, the solution containing ZnSO$_4$ and free residual H$_2$SO$_4$, in sufficient quantity to salify the lead oxides present in a new mass of paste to be treated, can be recycled in the process. The barium or calcium sulfate obtained from the process, due to their purity, can find applications in numerous industrial sectors (for example and not limited to paints, special cements, muds for oil drilling, etc.).

Example 3

In the process of Example 3 the same quantities of paste described for Example 1 were used, but 315 kg of zinc were used in the mixing step.

To solubilize the zinc oxide and the other zinc compounds, however, 1,935 kg of an aqueous solution of KOH preferably 31%, or more generally substantially comprised between 26% and 37%, were used, an excess quantity to the theoretical one to convert the zinc compounds into zincate, but important in order to support the subsequent electrolysis reaction. Operating in an alkaline environment during the electrolysis, the total recovery of lead is achieved.

In this case, the solution containing potassium zincate, potassium sulfate and excess potash is subjected to electrolysis in order to recover the zinc and separate the potash solution (potassium hydroxide) to be recycled in the process. An electrolytic cell made with a magnesium cathode and a nickel anode is used for this electrolysis process. This cell configuration has never been used for the recovery of zinc from alkaline solutions. This configuration allows operating with very high current densities (up to 1,200-1,400 A/m$^2$). The main advantage of working with an alkaline solution is a greater efficiency of the electrolytic cell which allows recovering 99.9% of the dissolved zinc, which separates in the form of powder.

In order to avoid the accumulation of the sulfate ion deriving from the lead sulfate contained in the lead paste, the final zinc-free solution deriving from the electrolytic cell was treated with barium hydroxide to cause a precipitation of the barium sulfate, which regenerates potassium hydroxide.

The insoluble $BaSO_4$ is separated and the potassium hydroxide is completely regenerated to be recycled in the first reaction.

It is finally clear that additions, modifications or variations, obvious to a person skilled in the art may apply to the present disclosure, without thereby departing from the scope of protection provided by the accompanying claims.

The invention claimed is:

1. Process for obtaining metallic lead from its compounds present in an end-of-life lead-acid battery by direct solid-solid reaction with metallic zinc, said process comprising:
   a) a dry mixing step of a mixture of lead compounds present in an end-of-life lead-acid battery with a metered quantity of metallic zinc powder, obtaining a mass;
   b) an addition to the mass, during mixing, of water and of an aqueous solution containing a substance capable of forming soluble zinc salts;
   c) a separation of a solid portion, consisting of metallic lead, from a liquid portion in which a soluble zinc salt is present;
   d) an electrolytic treatment of the liquid portion separated in step c) in order to recover metallic zinc suitable for reuse in the treatment referred to in step a);
   wherein the addition, to said mass, of water and of the aqueous solution containing the substance capable of forming soluble zinc salts, determines an achievement of a pH value comprised between 2.1 and 4.4, said pH value being indicative of a substantial separation between the solid, mainly comprising metallic lead, and the liquid portion in which the soluble zinc salt is present.

2. Process according to claim 1, wherein the substance capable of forming soluble zinc salts comprises sulfuric acid, wherein the liquid portion determines the production of a solution and wherein the dry mixing causes the obtainment of said mass,
   and/or wherein the process comprises a step of further treatment of an acid solution resulting from the electrolytic treatment to recover the metallic zinc with a metered quantity of carbonate or hydroxide, of an alkaline earth metal which reacts with part of sulfate ions present in the acid solution forming an insoluble sulfate, and wherein the step of further treatment of the acid solution comprises a separation of a residual acid solution with a quantity of free acid, the separation making said residual acid solution suitable for reuse in step b).

3. Process according to claim 1, comprising a step of pouring at least part of the solution resulting from the electrolytic treatment into a lead-acid battery, and wherein, after the step of pouring, said solution is destined to act as an electrolyte for the lead acid battery; said solution comprising zinc in an amount between 40 g/l and 140 g/l.

4. Process according to claim 2, comprising the use, instead of sulfuric acid as a substance capable of forming soluble zinc salts, of an aqueous solution containing at least one alkaline substance, said at least one alkaline substance reacting with the zinc compounds forming a soluble zincate and a soluble sulfate of the cation of the alkaline substance, wherein after the separation of the solid consisting essentially of metallic lead, the zincate of the alkaline substance and the sulfate of the cation present in the alkaline substance are present in the liquid portion.

5. Process according to claim 1, comprising an electrolysis treatment of the separated solution; said process further comprising a recovery of metallic zinc after the electrolysis treatment, said metallic zinc being suitable for use in the dry mixing step.

6. Process according to claim 5, wherein said electrolysis treatment is carried out in an electrolytic cell made with a magnesium cathode and a nickel anode, said electrolysis treatment taking place with current density comprised between 600 A/m$^2$ and 1400 A/m$^2$.

7. Process according to claim 2, wherein the sulfuric acid is sulfuric acid extracted from end-of-life batteries, and/or wherein the process comprises an extraction of sulfuric acid from end-of-life batteries and a use of the extracted sulfuric acid for said addition to the mass.

8. Process according to claim 2, wherein the carbonate of the alkaline earth metals is calcium or barium carbonate.

9. Process according to claim 6, wherein the electrolysis treatment determines the production of an alkaline solution;
   said process comprising a treatment of the alkaline solution resulting from the electrolytic treatment, said treatment taking place with barium hydroxide, said treatment producing an insolubilization of sulfate ions present in the alkaline solution and determining the production of insoluble barium sulfate, said alkaline solution constituting said substance capable of forming soluble zinc salts.

10. Process according to claim 1, wherein the addition of water and of an aqueous solution containing a substance capable of forming soluble zinc salts in said mass causes an exothermic reaction, and wherein the mixing step takes place with active heat removal, wherein the mixing step comprises the introduction of said mass into a mixer provided with a cooling jacket configured to at least partially dissipate the heat produced by the exothermic reaction.

11. Process according to claim 1, wherein the separation comprises the use of ultrasounds to facilitate the detachment of the solid, essentially consisting of metallic lead, from said liquid portion, optionally comprising the activation of at least one ultrasound transducer operatively acting on a containment tank of said mixer, to promote the detachment of the solid, essentially consisting of metallic lead, from said liquid portion.

12. Process according to claim 1, wherein the addition of water and of the aqueous solution containing the substance capable of forming soluble zinc salts follows the mixing step, and/or wherein the separation of the solid from the liquid portion follows the addition step, and wherein such separation determines a production of a separate solution, and/or wherein the electrolytic treatment follows the separation step.

13. Process according to claim 1, comprising a step of purification of the separated solution by addition of metallic zinc powder, said addition of metallic zinc powder causing a precipitation of impurities comprising at least one among the following compounds: manganese compounds, cadmium compounds, nickel compounds, cobalt compounds.

14. Process according to claim 2, wherein said substance capable of forming soluble zinc salts comprises sulfuric acid between 6% and 14%, or comprises sulfuric acid between 20% and 30%.

15. Process according to claim 1, wherein the mixing step lasts for a time substantially comprised between 2 minutes and 10 minutes and wherein the aqueous solution containing the substance capable of forming soluble zinc salts comprises potassium hydroxide, and/or wherein the addition to the mass, during the mixing step, of water and of the aqueous solution containing a substance capable of forming soluble zinc salts is an addition in two steps, comprising a first step of adding said substance, in particular sulfuric acid between 6% and 14%, and comprising a second step of adding said substance, said substance being sulfuric acid between 20% and 30%, said second step being subsequent to said first step and taking place when the free acidity of a resulting intermediate mixture is substantially absent, and/or comprising a step of crystallization of the soluble zinc salts, said crystallization step taking place after a purification process of said soluble zinc salts, wherein the crystallization step is a crystallization step of zinc salts of said liquid portion separated in step c).

16. Process according to claim 8, wherein said alkaline solution comprises excess potassium zincate, potassium sulfate and potassium hydroxide.

17. Process for obtaining metallic lead from its compounds present in an end-of-life lead-acid battery by direct solid-solid reaction with metallic zinc, said process comprising:

a) a dry mixing step of a mixture of lead compounds present in an end-of-life lead-acid battery with a metered quantity of metallic zinc powder, obtaining a mass;

b) an addition to the mass, during mixing, of water and of an aqueous solution containing a substance capable of forming soluble zinc salts;

c) a separation of a solid portion, consisting of metallic lead, from a liquid portion in which a soluble zinc salt is present;

d) an electrolytic treatment of the liquid portion separated in step c) in order to recover metallic zinc suitable for reuse in the treatment referred to in step a);

wherein the mixing step lasts for a time substantially comprised between 2 minutes and 10 minutes and wherein the aqueous solution containing the substance capable of forming soluble zinc salts comprises potassium hydroxide, and/or wherein the addition to the mass, during the mixing step, of water and of the aqueous solution containing a substance capable of forming soluble zinc salts is an addition in two steps, comprising a first step of adding said substance, in particular sulfuric acid between 6% and 14%, and comprising a second step of adding said substance, said substance being sulfuric acid between 20% and 30%, said second step being subsequent to said first step and taking place when the free acidity of a resulting intermediate mixture is substantially absent, and/or comprising a step of crystallization of the soluble zinc salts, said crystallization step taking place after a purification process of said soluble zinc salts, wherein the crystallization step is a crystallization step of zinc salts of said liquid portion separated in step c).

* * * * *